United States Patent [19]
Enke et al.

[11] 3,752,497
[45] Aug. 14, 1973

[54] INSTALLATION FOR STABILIZING THE VEHICLE BODY AGAINST CURVE-TILTING

[75] Inventors: Kurt Enke, Kirchheim/Teck; Klaus Bauer, Stuttgart-Heumaden; Udo Saftien, Waiblingen, all of Germany

[73] Assignee: Daimler-Benz AG, Stuttgart, Germany

[22] Filed: Sept. 28, 1971

[21] Appl. No.: 184,569

[30] Foreign Application Priority Data
Oct. 1, 1970  Germany.................. P 20 48 323.3

[52] U.S. Cl........................... 280/112 A, 280/124 F
[51] Int. Cl............................................... B60g 17/04
[58] Field of Search.................... 280/112 A, 112 R, 280/124 F, 6 H

[56] References Cited
UNITED STATES PATENTS
3,550,993  12/1970  Peiffer......................... 280/124 F X
2,965,388  12/1960  Dettwiler....................... 280/112 A
2,165,617   7/1939  Paes................................ 280/6 H
3,233,909   2/1966  Boone............................. 280/6 H Primary Examiner—Philip Goodman
Attorney—Craig, Antonelli & Hill

[57] ABSTRACT

An installation for stabilizing the vehicle body against curve-tilting, in which an erecting force is exerted on the side of the vehicle body disposed on the outside of the curve, whereby a pressure medium is supplied in dependence on the curve drive of the vehicle directly to the pistons of cylinder-piston units connected between the wheels and the vehicle body in such a manner that the cylinder-piston unit associated with the wheel on the inside of the curve is shortened in the sense of a lowering of the vehicle body and the cylinder-piston unit associated with the wheel on the outside of the curve is lengthened in the sense of a lifting of the vehicle body.

20 Claims, 1 Drawing Figure

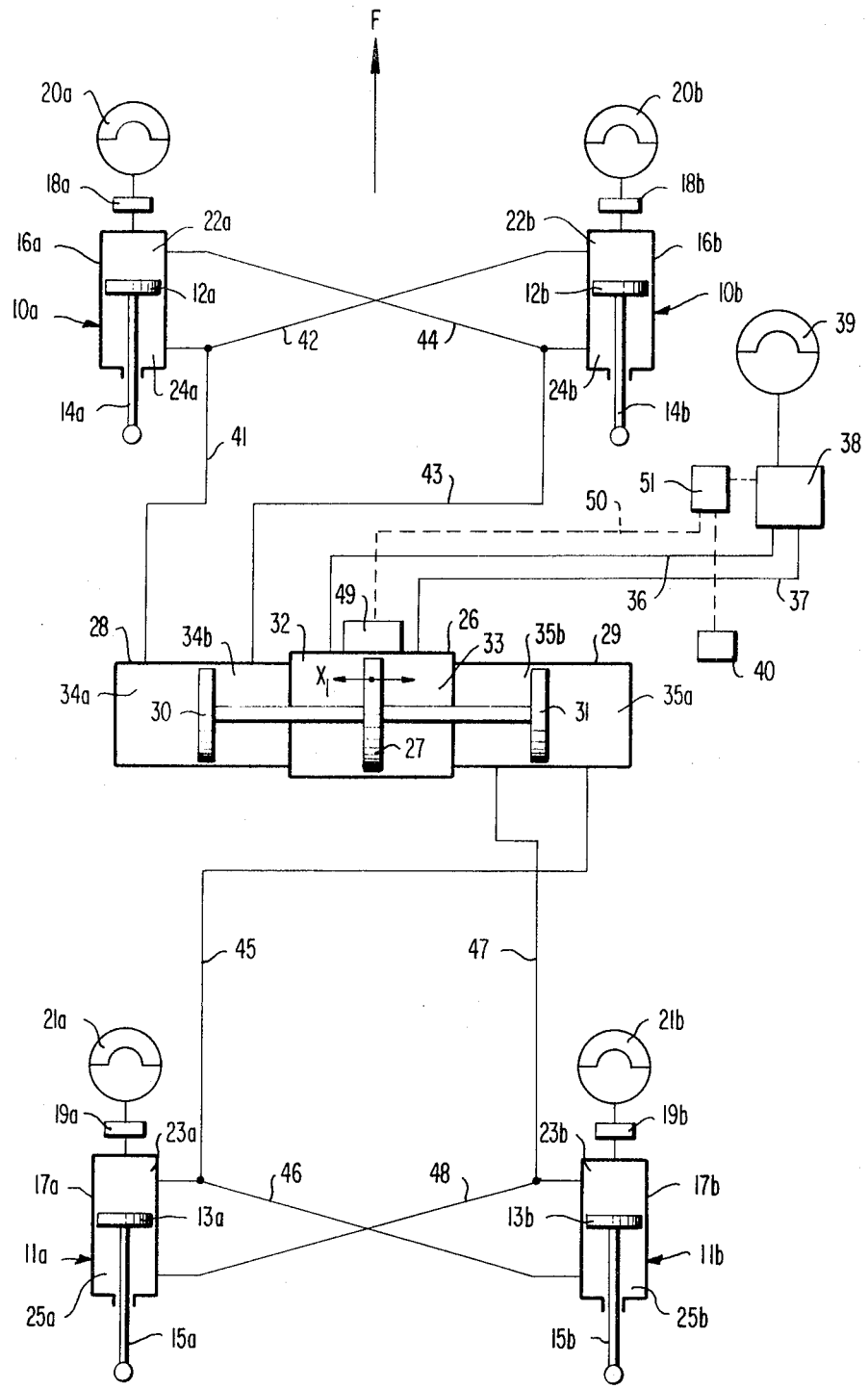

INSTALLATION FOR STABILIZING THE VEHICLE BODY AGAINST CURVE-TILTING

The present invention relates to an installation for stabilizing the vehicle body against curve-tilting, in which an erecting force is exerted on the curve-outerside of the vehicle body, especially with the use of hydro-pneumatic springs for the vehicle spring system.

It is known to exert such an erecting force by means of a rotating vane-type adjusting motor which acts on the wheel guide elements of an axle by way of a torsion rod stabilizer. The rotary vane-type adjusting motor is thereby fed with a pressure medium in the one or the other direction of rotation from the pressure reservoir by way of a control valve controlled by the curve tilting. This known installation, however, presupposes a torsion rod stabilizer, which cannot be installed everywhere.

The present invention aims at a simplification in the construction of the stabilization of the vehicle body, whereby the stabilization includes also such an influencing of the spring system and/or of the vehicle body, by means of which the body is tilted toward the inside opposite the centrifugal force in dependence on the curve drive of the vehicle. Accordingly, the present invention essentially consists in that a pressure medium is fed in dependence on the curve drive directly to the pistons of cylinder-piston aggregates interconnected between the wheels and the vehicle body, especially hydro-pneumatic springs, in such a manner that the cylinder-piston aggregate coordinated to the wheel on the inside of the curve is reduced in the sense of lowering the vehicle body and the cylinder-piston aggregate coordinated to the wheel on the outside of the curve is elongated in the sense of lifting the vehicle body.

Preferably a double-acting displacement-piston aggregate adjusted in dependence on the curve drive is provided for the supply of the pressure medium, whereby each piston of the piston aggregate acting as displacement space is connected crossed-over with an upper piston space of the cylinder-piston aggregate of one vehicle side and with a lower piston space of the cylinder-piston aggregate of the other vehicle side.

Advantageously, the piston of the cylinder-piston aggregate interconnected between wheel and vehicle body and coordinated to the spring system is operatively connected by means of a piston rod with the wheel or with a part connected with the wheel or swinging in unison therewith and the cylinder is operatively connected with the vehicle body or with a part connected with the same. The diameter of the pistons as well as of the piston rod thereby determine the ratio of the unidirectional spring stiffness to the alternate spring stiffness.

Preferably a common working-displacement aggregate adjustable in dependence on the curve drive is provided for the spring systems of the front and of the rear axle. In a particularly preferred embodiment, the common working-displacement aggregate is thereby provided with a central working cylinder-piston aggregate controlled by a pressure medium, whose piston alternately acted upon depending on the curve drive connected by means of oppositely directed piston rods with one double-acting displacement-piston each for the front axle and the rear axle, respectively. The center piston thereby has advantageously a larger diameter than the lateral double-acting pistons for the front and rear axle.

The control valve controlling the displacement pistons, for example, by way of the center working piston is, in its turn, advantageously controlled electrically. An accurate and particularly advantageous control of the stabilization installation is achieved, which can be installed in the vehicle at any desired place, by means of a signal derived from the inclination of the vehicle body or the travel of a working or displacement pistons—as measured by a displacement pick-up—and by means of a second signal derived from an acceleration pick-up, which are compared in an electronic control device of conventional construction.

Accordingly, it is an object of the present invention to provide an installation for the stabilization of the vehicle body against curve-tilting which avoids by simple means the aforementioned shortcomings and drawbacks.

Another object of the present invention resides in an installation for stabilizing the vehicle body against curve-tilting which can be installed into any vehicle and does not require, as a prerequisite, a torsion rod stabilizer or the like.

A further object of the present invention resides in an installation for stabilizing the vehicle body against curve-tilting which is simple in construction and reliable in operation and which utilizes existing parts in an effective manner.

These and further objects, features and advantages of the present invention will become more apparent from the following description when taken in connection with the accompanying drawing which shows, for purposes of illustration only, one embodiment in accordance with the present invention, and wherein:

The single FIGURE is a schematic view of an installation in accordance with the present invention for stabilizing the vehicle body against curve-tilting.

Referring now to the single FIGURE of the drawing, the cylinder-piston aggregates (spring legs) of the front wheels coordinated to the spring system are generally designated in this FIGURE by reference numerals 10a and 10b and the cylinder-piston aggregates of the rear wheels coordinated to the spring system are designated generally by reference numerals 11a and 11b, whereby the driving direction is indicated by arrow F. The pistons 12a, 12b and 13a, 13b are connected by means of the piston rods 14a, 14b and 15a, 15b to a respective vehicle axle whereas the cylinder 16a, 16b and 17a, 17b are connected to the vehicle body preferably under interconnection of damping means 18a, 18b and 19a, 19b of conventional construction, and more particularly are connected hydraulically to the spring reservoirs 20a, 20b and 21a, 21b, which are in communication with the upper piston space 22a, 22b and 23a, 23b. The lower piston spaces 24a, 24b and 25a, 25b, as also additionally the upper piston spaces, are connected with the hydraulic system of the stabilization installation in the manner to be described more fully hereinafter. By reason of the piston rods 14a, 14b and 15a, 15b the lower piston spaces have a smaller effective pressure area than the upper piston spaces.

The working-displacement aggregate for the adjustment of the cylinder-piston units 10a, 10b, 11a and 11b includes a cylinder 26 of relatively large diameter with a working piston 27 as well as two lateral displacement cylinders 28 and 29 of smaller diameter with displacement pistons 30 and 31 sliding therein, which are rigidly connected with the working piston 27 by piston rods. Piston spaces 32 and 33 are formed in the working cylinder 26 on both sides of the working piston 27, and piston spaces 34a, 34b and 35a, 35b are formed in the displacement cylinders 28 and 29 on both sides of the pistons 30 and 31, respectively.

The piston spaces 32 and 33 are alternately and selectively fed with a pressure medium from a pressure reservoir 39 by way of lines 36 and 37 by a corresponding control of a conventional control valve 38, which pressure medium is appropriately the same pressure medium, especially oil, as also fills the piston spaces of the cylinder-piston aggregates 10a, 10b, 11a, 11b coordinated to the spring system as well as the piston spaces of the displacement cylinders 28, 29. The control valve 38 is controlled during a curve drive by way of a conventional control device 51 by means of lateral acceleration pick-up or transmitter 40 also of any known conventional construction. The control device 51 can also be influenced in dependence on the steering or in any other appropriate known manner in dependence of the curve drive.

As further illustrated in the drawing, the piston space 34a of the displacement cylinder 28 is connected by way of lines 41 and 42 with the piston spaces 24a and 22b, the piston space 34b is connected by way of lines 43 and 44 with the piston spaces 22a and 24b, the piston space 35a is connected by way of lines 45 and 46 with the piston spaces 23a and 25b and the piston space 35b is connected by way of lines 47 and 48 with the piston spaces 25a and 23b so that always a lower piston space of the cylinder-piston aggregate coordinated to the spring system of one wheel of a vehicle axle is connected with the upper piston space of the cylinder-piston aggregate coordinated to the spring system of the opposite wheel as well as with one of the piston spaces of a displacement cylinder of the working-displacement aggregate.

The drawing further indicates a line 50 (shown in dash lines) controlled by a motion pick-up 49 of conventional construction and starting from the cylinder 26 of the operating aggregate, which leads to the electronic control device 51 in which the displacement of the working piston 27 as measured by the motion pick-up 49 or the tilting of the vehicle body is compared with a signal produced by the lateral acceleration transmitter 40 for purposes of controlling the pressure medium supply to the cylinder 26.

OPERATION

The operation of the stabilization installation according to the present invention is as follows:

If the vehicle drives, for example, through a left curve, then the control valve 38 receives from the control device 51 a signal and permits the pressure medium, for example, pressure oil, to reach the piston space 33 from a pressure reservoir 39 by way of the line 37 and to act on the work-piston 27. The latter is displaced in the direction of arrow $X_1$ together with the displacement pistons 30 and 31 so that the pressure medium is sucked out of the piston spaces 22a, 24b by way of the lines 44, 43 into the piston space 34b and out of the piston spaces 23a, 25b by way of lines 46, 45 into the piston space 35a and pressure medium is displaced out of the piston space 34a into the piston spaces 24a and 22b by way of lines 41 and 42 and out of the piston space 35b into the piston spaces 23b and 25a by way of the lines 47, 48. The cylinder-piston aggregates, i.e., the spring legs 10a, 11a, coordinated to the spring system of the left vehicle side and corresponding to the inner side of the curve, are thereby shortened or acted upon in a shortening sense whereas the cylinder-piston aggregates, i.e., the spring legs 10b, 11b coordinated to the spring system of the right vehicle side and corresponding to the outside of the curve are elongated or acted upon in an elongating sense. If the working piston has travelled the path associated with the effective lateral actuation or if the vehicle body has reached the corresponding inclination, then the signal of the control device 51 disappears and the oil supply to the space 33 stops. Since the control device 51 and its operation are known as such and involve conventional circuits, a detailed description thereof is dispensed with herein. In this manner the effects of the centrifugal forces on the vehicle body can be compensated for either completely or partially and the vehicle body can be stabilized against curve-tilting or can be tilted toward the inside of the curve.

It is thereby possible by the electronic control device 51 to coordinate to each magnitude of the lateral acceleration a predetermined path of the working piston 26 and therewith a predetermined stiffening of the spring system or a predetermined inward tilting of the vehicle body.

While we have shown and described only one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What we claim is:

1. An installation for stabilization of curve tilting of a vehicle body provided with front and rear wheels comprising double-acting cylinder-piston units interconnected between the wheels and the vehicle body, a common displacement unit for supplying a pressure medium in dependence upon the curve direction of the vehicle, means connected to a first portion of said displacement unit for supplying the pressure medium to the front wheels, means connected to a second portion of said displacement unit for supplying the pressure medium to the rear wheels of the vehicle and cross-over means for supplying the pressure medium from the upper side of a cylinder-piston unit on one vehicle side with the lower side of a cylinder-piston unit on the other vehicle side.

2. An installation according to claim 1, characterized in that said cylinder-piston units include hydropneumatic spring means.

3. An installation according to claim 2, wherein the piston of a cylinder-piston unit is connected to the wheel by means of a piston rod and the cylinder thereof is connected with the vehicle body.

4. An installation according to claim 3, characterized in that the common displacement unit includes a central working cylinder-piston unit controlled by a pressure medium whose piston, alternately acted upon depending on the curve drive, is operatively connected by means of oppositely directed piston rods with one double-acting displacement piston each for the front wheels and the rear wheels, respectively.

5. An installation according to claim 4, characterized in that the central working piston has a larger effective diameter than the lateral double-acting displacement pistons.

6. An installation according to claim 5, further comprising a control valve means for supplying the working cylinder piston unit with the pressure medium and for adjusting the cylinder-piston units, said control valve means being controlled by an electronic control means for providing a signal of the curve path of the vehicle.

7. An installation according to claim 6, characterized in that the inclination of the vehicle body is measured and together with the lateral acceleration, measured by an acceleration measuring means, is processed in an electronic control means into a signal which controls the control valve means in a predetermined manner.

8. An installation according to claim 7, characterized in that the tilting of the vehicle body is measured by measuring the travel of one of the pistons consisting of working and displacement pistons.

9. An installation according to claim 8, characterized in that said cylinder-piston units include hydropneumatic spring means.

10. An installation according to claim 1, wherein the piston of a cylinder-piston unit is connected to the wheel by means of a piston rod and the cylinder thereof is connected with the vehicle body.

11. An installation according to claim 1, characterized in that the common displacement unit includes a central working cylinder-piston unit controlled by a pressure medium whose piston, alternately acted upon depending on the curve drive, is operatively connected by means of oppositely directed piston rods with one double-acting displacement piston each for the front wheels and the rear wheels, respectively.

12. An installation according to claim 11, characterized in that the central working piston has a larger effective diameter than the lateral double-acting displacement pistons.

13. An installation according to claim 1, further comprising a control valve means for supplying said common displacement unit with the pressure medium and for adjusting the cylinder-piston units said control valve means being controlled by an electronic control means for providing a signal of the curve path of the vehicle.

14. An installation according to claim 13, characterized in that the inclination of the vehicle body is measured and together with the lateral acceleration, measured by an acceleration measuring means, is processed in an electronic control means into a signal which controls the control valve means in a predetermined manner.

15. An installation according to claim 14, characterized in that the tilting of the vehicle body is measured by measuring th travel of one of the pistons consisting of working and displacement pistons.

16. An installation according to claim 1 wherein said common displacement unit includes a main cylinder having disposed therein a working piston, said working piston being provided with a piston rod on each side thereof extending into said first and second portions of said displacement unit.

17. An installation according to claim 16, wherein said first and second portions of said displacement unit include a first and second cylinder, each disposed on one side of said main cylinder, having a piston connected to said piston rods on said working piston.

18. An installation according to claim 17 wherein said first and second cylinders are divided into a first and second chambers by the piston disposed therein with said means for supplying the pressure medium to the front wheels and said means for supplying the pressure medium to the rear wheels being in communication with said first and second chambers.

19. An installation according to claim 18 wherein said means for supplying the pressure medium to the front and rear wheels each include a first and second conduit communicating respectively with said first and second chambers.

20. An installation according to claim 19 wherein said first and second conduits are operatively connected to the lower side of a respective double-acting cylinder-piston unit.

* * * * *